United States Patent [19]

Tewesmeier

[11] Patent Number: 4,593,348

[45] Date of Patent: Jun. 3, 1986

[54] DEVICE FOR THE GENERATION OF REGULATED AND/OR ADJUSTABLE DIRECT VOLTAGES OR DIRECT CURRENTS

[75] Inventor: Werner Tewesmeier, Seelze, Fed. Rep. of Germany

[73] Assignee: Autola Stromrichter GmbH & Co. KG, Fed. Rep. of Germany

[21] Appl. No.: 600,500

[22] Filed: Apr. 16, 1984

[30] Foreign Application Priority Data

Apr. 16, 1983 [DE] Fed. Rep. of Germany ....... 3313944

[51] Int. Cl.$^4$ ........................ H02P 13/24; G05F 1/44
[52] U.S. Cl. ...................................... 363/85; 363/41; 320/9; 323/241; 323/283
[58] Field of Search .................. 363/41, 96, 97.85, 67, 363/70; 323/241, 283, 322, 267; 320/9, 13, 2, 14, 21

[56] References Cited

U.S. PATENT DOCUMENTS

| | | | |
|---|---|---|---|
| 3,601,674 | 8/1971 | Joslyn et al. | 318/318 |
| 4,337,509 | 6/1982 | Omae et al. | 323/241 |
| 4,401,935 | 8/1983 | Yerkes | 320/9 |

FOREIGN PATENT DOCUMENTS 202877 12/1982 Japan ..................................... 363/41

OTHER PUBLICATIONS

Pulse Battery Charger Employing 1000 Amphere Transistor Switches, R. L. Steigerwald, Oct. 1977, IAS '77 Annual, pp. 1127-1132.

Primary Examiner—Peter S. Wong
Assistant Examiner—Judson H. Jones
Attorney, Agent, or Firm—Dressler, Goldsmith, Shore, Sutker & Milnamow, Ltd.

[57] ABSTRACT

A device is described for the generation of drive signals for thyristors or power transistors in circuits for the energy supply of apparatuses and installations with regulated and/or adjustable direct voltages or direct currents. In systems with a master or controlling computer there serves as desired value giver a digital memory, which makes available the calculated desired values as a binary number on its output, while as actual-value giver there serves a binary counter which counts the beat impulses of the computer, in which system a comparison circuit on equality of the numbers triggers an impulse the time beginning of which corresponds to the ingate angle or its duration to the impulse width of a pulse-width modulated signal. A control device controls the reading of the desired values into the memory and of the actual values into the counter and synchronizes the impulses of the comparison circuit with synchronizing impulses derived from the mains voltage or from the beat impulses of the master or controlling computer.

6 Claims, 2 Drawing Figures

DEVICE FOR THE GENERATION OF REGULATED AND/OR ADJUSTABLE DIRECT VOLTAGES OR DIRECT CURRENTS

BACKGROUND OF THE INVENTION

Frequently for the energy supply of electronic apparatuses and installations and/or for the control of drives, processes etc. there are needed regulated or also adjustable direct voltages and currents. In the case of relative great powers there are used for the generation of direct voltages and currents controllable rectifiers in which thyristors are used. Thyristors are controllable valves which are also blockable in pass direction, in which, however, with voltage applied in this direction the time point of the current onset can be determined by an ignition process. The ignition of a thyristor occurs as a rule through an ignition impulse which is delivered from an ignition apparatus, the time point of the ignition determining the magnitude of the voltage or of the current, which is delivered to the user.

An ignition stage for a one-phase bridge rectifier operates as follows. The time onset of the ignition impulses (ignition angle) referred to the beginning of half period of the main alternating voltage (voltage zero passage) determines the height of the direct voltage. An ignition angle of 0° means electrically, for example, in the case of ohmic-inductive load of the rectifier full direct voltage, an ignition angle of 180° electrically means, in contrast, zero direct voltage. The time-defined ignition impulses are generated there as follows: An impulse generator in the form of a synchronizing stage forms from the main alternating voltage synchronizing impulses which correspond exactly to the zero passages of the alternating voltage. With these impulses there is triggered a sawtooth generator which delivers a voltage rising in ramp form. In a comparison circuit this voltage is compared with an external voltage which represents the ignition angle of the apparatus and thereby the desired value of the direct voltage. This desired magnitude is normally generated by a master controller. In the case of equality of the two voltages the comparison circuit triggers the generation of a drive impulse for the thyristor. Since in a one-phase bridge rectifier each half-wave of the main voltage is rectified by different thyristors, there is engaged on the outlet side of the comparison circuit a further stage for channel separation. This evaluates the positive and negative half-wave of the mains voltage and gives out every 180° electrically an impulse to the corresponding thryistors.

For complex control, monitoring and regulating problems, in which a large amount of data are to be processed, in installations or apparatuses there are frequently used computers (mini- or microcomputers), since these present considerable advantages over the use of permanently wired analog circuits, for example in respect to the flexibility of the parameter changes, in respect to the circuitry expenditure and the costs. In such apparatuses or installations the desired values of needed direct voltages and currents and thereby the ignition angle of thyristors are calculated by the computer and are present, therefore, in the digital form. Nevertheless, hitherto the above-described ignition apparatuses for thyristors have been used in such installations and apparatuses, in which for the generation of the needed analog desired value for the ignition apparatus digital-analog transducers were used which transform the binary number (desired value) prescribed by the computer into a corresponding voltage.

This method has, to be sure, proved itself for a long time, but it is affected with several disadvantages. Thus, for an accurate digital-analog conversion there is required a very precise reference magnitude (either current or voltage), which must have as low as possible a temperature coefficient. Such component are available, to be sure, but they bring about relatively high costs. Nevertheless, even with use of very accurate D/A converters, in consequence of deficient long-time stability there can occur transmission errors which have a negative effect on the quality of the regulation.

The component stages of the ignition apparatus of the thyristors engaged on the outlet side of the D/A converter are constructed as a rule with operational amplifiers. Here, too, it is necessary to reckon with a certain temperature drift, which has a negative effect on the regulation. In order to catch up certain exemplary scatters of active or passive components, and in order to set in certain maximum ignition angles, in this stage, as a rule, a balancing is necessary.

Even in the use of analog, integrated circuits which already contain a large part of the components needed for an ignition apparatus, it is to be considered that passive components are necessary as external circuitry for an integrated circuit, (for example, capacitors and resistors for the generation of the ramp function), which by reason of imprecision and exemplary scatters again decrease the otherwise good properties of the integrated circuit. The use of analog integrated circuit has, to be sure, lowered the manufacturing costs of the ignition apparatus, but the still necessary passive components hardly allow cost reductions. Furthermore, as a rule, here, too, a balancing is required.

Similar problems arise, too, in circuits with power transistors which are used as adjusting members for the generation of transformation of direct voltages. Of these so-called switching regulators there exist many variants, for example, blocking transformers, one-beat or push-pull flux transformers or also bridge transformers, common to all of which is the working principle that is based on the raising of the operating frequency and the driving of power transistors as rapid switches.

A switching circuit, for example, operates as follows: The mains voltage is rectified, converted by the switching regulator into a square wave voltage and transformed to the desired voltage level. The square wave voltage is then again rectified.

Switching regulators are operated at fixed frequencies in the range from 1 kHz to about 100 kHz. The adjustment or regulation of current and voltage occurs over the impulse width of the square wave signal that is delivered from an analog regulator, and with which the power transistors are driven.

Similarly as in the operation of thryistors, also in this case there must be generated a signal precisely defined in the time and synchronized with a firmly prescribed frequency. In apparatuses or installations in which such switching regulators are used, and in which the regulation and prescription of the desired values occurs from a digital computer, there is used as a rule, the same principle of the generation of the control impulses as in the drive of thryistors, namely use of the component groups D/A converter—impulse generator for the generation of synchronizing impulses—actual value giver in the form of a ramp generator—comparison circuit.

Although in switching regulators integrated circuits are being used to an increasing degree, which contain nearly all the required functions, here, too, further passive components must be used, the disadvantages of which were already mentioned above.

The invention proceeds from a device from the generation of regulated and/or adjustable direct voltages or direct currents with use of semiconductor elements in the form of thyristors or power transistors, with an impulse generator for the generation of sychronizing impulses of prescribed frequency, with an actual-value giver controlled according to provision of the impulse generator, with a desired-value giver that delivers desired values which are a measure for the required direct voltage or for the required direct current, and with a comparison circuit which compares the output of the actual-value giver with the desired values and on equality delivers in each case a drive signal for the semiconductor element.

Underlying the invention is the problem of creating a device of the aforementioned type, which with digital desired-value prescription, is simpler in construction than the known circuits and assures a higher quality of the regulation.

SUMMARY OF THE INVENTION

The problem posed is solved according to the invention by the means that in use of the device in a system with a master or control computer as desired-value giver there is provided a digital memory, which makes available on its output as binary number the desired values calculated by the master or control computer, that as actual-value giver there serves a binary counter that counts the clock impulses of the master or control computer, that the comparison circuit is constructed in such a way that on equality of the numbers in the memory and the counter it gives of an impulse the time beginning of which corresponds to the lead angle or its duration to the impulse width of an impulse-width modulated signal, and that a control device is provided which receives the control signals from the master or control computer, which controls the reading of the desired values into the memory and of the actual values into the counter, and which synchronizes the impulses delivered from the comparison circuit with the synchronizing impulses delivered from the impulse generator and drives the semiconductor element.

The device of the invention, therefore, processes the prescribed desired values purely digitally without analog intermediate circuit. By reason of this circuitry principle, it is possible largely to dispense with the use of passive component elements, and also unnecessary is the use of digital-analog converters with appertaining reference magnitude generation, and, too, all problems by reason of a temperature drift of an exemplary scatter drop out. Likewise a balancing of the ignition stage is no longer necessary.

BRIEF DESCRIPTION OF THE DRAWING

The invention is explained in detail with the aid of examples of execution represented in the drawing. In the drawing.

DETAILED DESCRIPTION

Figure 1:
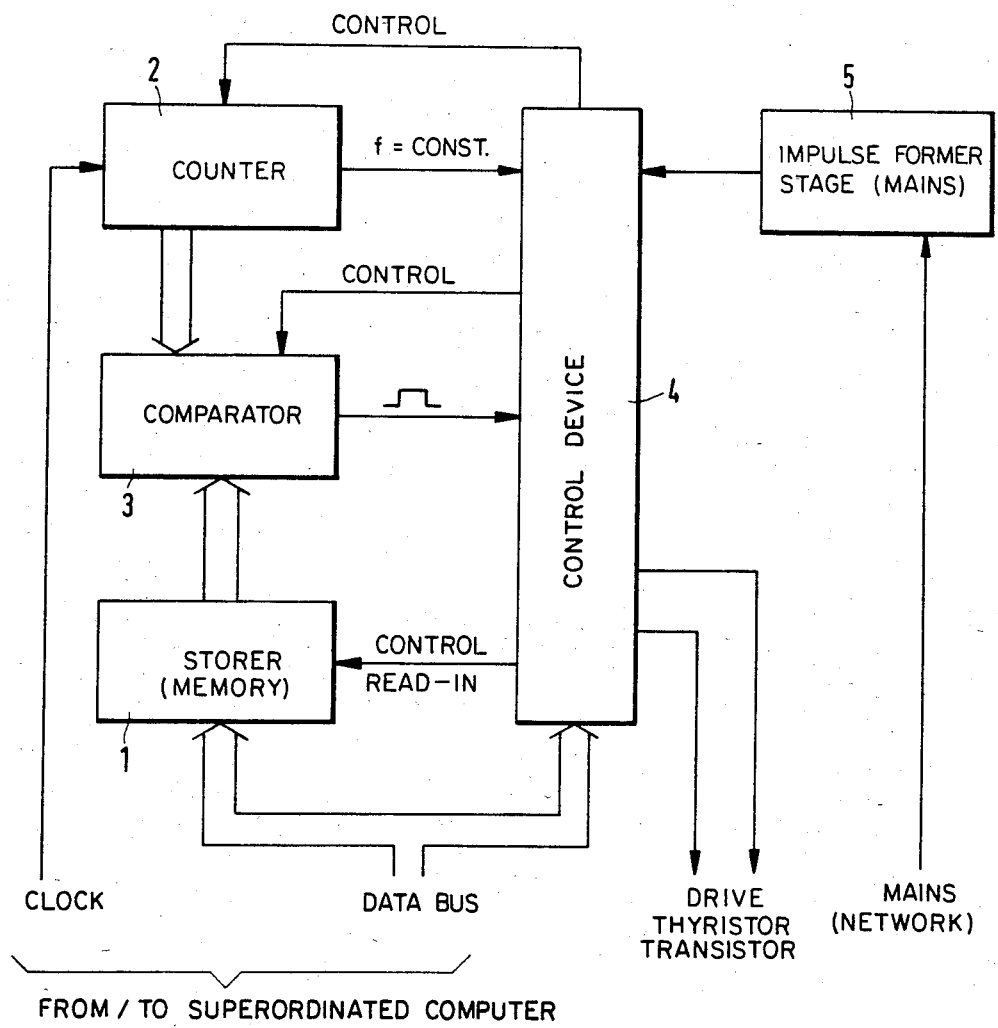
FIG. 1 is a block circuit diagram of the device according to invention.

In the block circuit diagram represented in FIG. 1, the information data on the ingate or lead angle or on the impulse width of a pulse-width modulated signal are fed from a master or control computer in the form of a sixteen-bit binary number into a digital memory 1. Simultaneously, a control device 4 receives over the data bus control signals from the master or control computer. The control device 4 passes on commands to the memory 1, which serve for the control of the reading of information data into the memory. The memory makes available the information data on its output as a binary number.

A sixteen-stage binary counter 2 receives as input the signals the beat or clock impulses of the master or control computer and counts these. Furthermore, also the counter 2 receives control commands from the control device 4. The Counter presents on its output a binary number that indicates how many beat or clock periods have passed since the counter start. From this number multiplied with the period duration of the beat impulses there is obtained, therefore, the time elapsed since the counter start. In digital actual-value generation it is advantageous to use the beat impulses of the master or control computer as input signals to the counter, since thereby there is already present a reference signal belonging to the system and the separate impulse generator is dispensed with. In addition, the counter delivers an impulse sequence of fixed frequency, which is an integral part of the beat or clock frequency and serves as synchronizing signal for the operation of power transistors. This double function of the counter is achieved, if need be, by the means that a certain output of the counter, depending on the required frequency, is connected over the control device with the resetting input of the counter. The outputs of the memory 1 and of the counter 2 are fed to a comparison circuit 3, in which the numbers are compared with one another. On equality of the two numbers and presence of corresponding control commands an output flip-flop of the comparison circuit 3 is set. The time impulse commencement, therefore, is determined by the binary number delivered from the memory. The impulse length is established by a synchronizing signal which comes from the control device and simultaneously resets the flip-flop and the counter. Thereby the counter again begins at zero with the counting, the above-described processes are repeated, and there is generated a pulse-width modulated signal, the impulse length of which is prescribed by a binary number, and the period duration of which is established by synchronizing impulses of a certain frequency.

The control device has the assignment of synchronizing the impulses delivered from the comparison circuit with the mains frequency or another firmly prescribed frequency. It is supplied for this with synchronizing signals from an impulse former stage 5 and from the counter, which gives off an impulse sequence of fixed settable frequency. The impulse-former stage generates from the sinusoidal mains voltage of 50 Hz, a 100 Hz impulse sequence with 500 ns impulse duration. The beginning of the impulses corresponds in each case to the zero passage of the mains alternating voltage. This impulse sequence is needed in operation of thyristors, while the operation of transistors requires a higher synchronizing frequency. In this case, as already mentioned, the counter is used also as impulse generator. Since in the control device there are already present mains-synchronous signals, in this component group a circuit is accommodated which used these signals for channel separation in thryistor operation. It provides that the individual thryistors of a single-phase bridge circuit are driven in correspondence to the mains voltage course, as was already explained in the description of a conventional drive circuit.

The control device 4 contains, further, a switch-over arrangement with locking circuit, in order to provide that the pulse-width modulated signal is conducted onward either to the control stage of thyristor set or to the driver stages of power transistors. Information data on the required frequency and the component group to the driven are obtained by the control device 4 over the data bus. These data, which are present in binary form, are used to set two separate flip-flops, of which the one is switched on in transistor operation and the other in thyristor operation. As soon as one flip-flop is set, the other receives a signal which prevents a setting of this flip-flop. Thereby there is achieved a mutual blocking of both flip-flops, and there can never the driving of thyristor and transistors simultaneously, for example, by reason of a software error.

Figure 2:
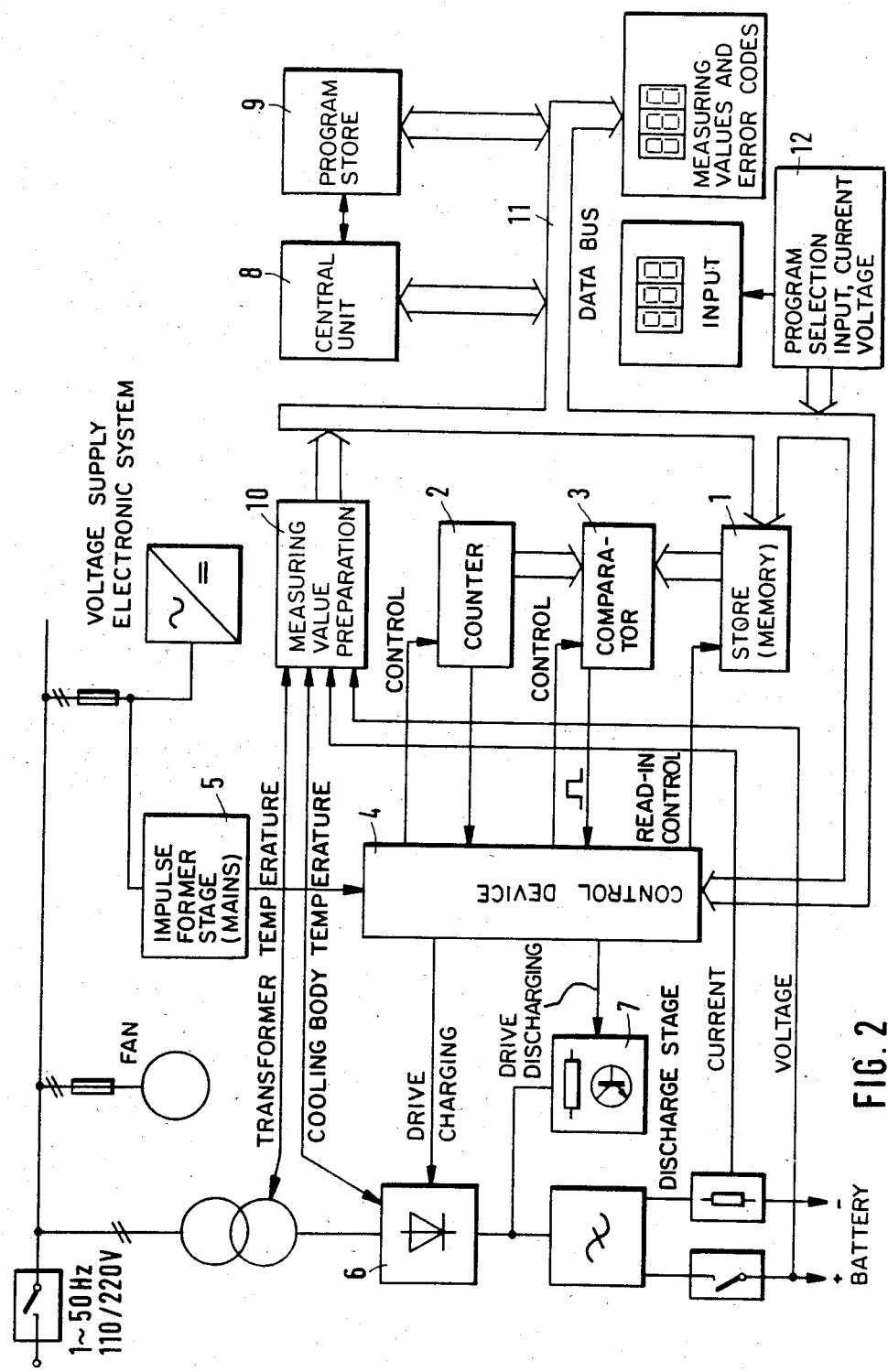
FIG. 2 is a block circuit diagram of the device according to FIG. 1 in connection with a battery maintenance circuit.

FIG. 2 shows the use of the device of the invention in a microprocessor-controlled battery maintenance apparatus, which is used for the charging and discharging of batteries. The same reference numbers are used here for the same parts as in FIG. 1. The charging circuit 6 of the apparatus consists of a half-wave one-phase rectifier bridge with thryistors, and the discharge circuit 7 is constructed in beat technique as a blocking transformer with transistors.

The central unit 8 containing the microprocessor receives from a program memory 9 commands on the charging or discharging of batteries and the parameters to be observed there, and from built-in measuring systems 10 information data on the momentary value of charging or discharging current and the battery voltage. After processing of all the information data the microprocessor, which in this case works also as regulator, sends commands in binary form to the charging or discharging stage 6 or 7, respectively. To a common data bus there are connected the central unit 8, the program memory 9, the input 12, the memory 1 and the control device 4. The commands of the microprocessor which pass over the data bus to the control device 4, contain as binary values the ignition angle of the thyristors or data on the length of impulses of the drive of the power transistors and also status data, such as charging, discharging or locking signals.

The control device 4 processes the status data and controls the reading of the information data into the memory 1. Furthermore, the control device serves for the selection of the required synchronizing signals for the charging and discharging, which it receives either from the counter 2 or from the impulse former stage 5 and passes on to the counter 2 and the comparison circuit 3. The counter 2 is fed by the beat impulses of the microprocessor. With each synchronizing impulse its 16-place output is set on zero. It then counts until it is again set on zero by a renewed synchronizing impulse. The output of the counter then gives in each case in binary from the time elapsed since the last resetting signal as a multiple of the beat time.

During the counting process the comparison circuit 3 constantly compares the output of the counter with the number contained in the memory 1. On equality of both numbers the comparison circuit 3 gives off a signal which sets a flip-flop that is contained in the comparison circuit. This flip-flop is reset again by the synchronizing impulses, so that on its output there appears a signal which begins, relatively to the synchronizing impulses, after a certain time that corresponds to the ingate angle of thyristors and has an exactly defined length which corresponds to the impulse width for the drive of power transistors. The pulse-width modulated signals pass onto the control device 4. This contains a switch-over arrangement in combination with a locking circuit (as described above) in order to provide that the signal is conducted onward only to the thryistors or only to the power transistors. Furthermore, for the drive impulses of the thyristors there occurs a channel separation, so that each synchronizing of the half-controlled rectifier bridge is ignited during the half-wave allocated to it of the mains voltage.

As already mentioned, the counter 2 indicates on its output the elapsed time between two synchronizing impulses as a multiple of the beat time of the microprocessor. This means that the processor must calculate the drive angle of thyristors as a multiple of the beat time. Also the information on the impulse duration of the drive signals of the transistors must be present as a multiple of the beat time. There, however, it is to be taken into account that the comparison circuit 3 gives off a signal only after expiration of the time indicated in the memory, and there is needed, therefore as drive signal in the discharging (operation of the transistors) the complement of the impulse duration to be set in to the period duration of the synchronizing impulses the processor, therefore, must calculate the duration of the impulse pause as a multiple of the beat time. This is easily achievable over corresponding steps in the program of the microprocessor.

What is claimed is:

1. A device for the generation of regulated and/or adjustable direct voltage or direct currents with use of semiconductor elements in the form of thyristors or power transistors, with an impulse generator for the generation of synchronizing impulses of prescribed frequency, with an actual value giver controlled according to provision of the impulse generator, with a desired value giver that delivers desired values which are a measure for the required direct voltage or for the required direct current, and with a comparison circuit which compares the output of the actual value giver with the desired values and on equality delivers in each case a drive signal for the semiconductor element, characterized in that the device forms part of a battery maintenance circuit containing a thyristor circuit (6) and a transistor circuit (7) in a system with a controlling computer (8) as desired value giver, a digital memory (1) which makes available on its output the desired values calculated by the controlling computer (8) as a binary number, a binary counter (2) as an actual value giver which counts the beat impulses of the controlling computer, the comparison circuit (3) is formed in such a way that on equality of the numbers of the memory (1) and of the counter (2) it triggers an impulse the time beginning of which corresponds to the ingate angle for the thyristor circuit for the charging of the battery to be maintained, and its duration to the impulse width of a pulse-width modulated signal for the transistor circuit for the discharging of the battery to be maintained, and that a control device (4) is provided which receives control signals from the controlling computer (8), which controls the reading of the desired values into the memory (1) and of the actual values into the counter (2), and which synchronizes the impulses delivered from the comparison circuit (3) with the synchronizing impulses delivered from the impulse generator and drives the semiconductor element, and the control device (4) contains a switch-over arrangement in combination with a locking circuit, which brings about a conduction onward of the signal either only to the thyristors for charging the batteries to be maintained or only to the power transistors for discharging the batteries to be maintained.

2. Device according to claim 1, characterized in that the binary counter (2) is a 16-stage counter.

3. Device according to claim 2, characterized in that the impulse generator for the generation of synchronizing impulses for the drive of thyristors consists of an impulse-former stage (5) which generates from the mains voltage a 100 Hz impulse sequence, the beginning of the impulses corresponding in each case to the zero crossing of the mains alternating voltage.

4. Device according to claim 2, characterized in that the counter (2) serves additionally as impulse generator for the generation of synchronizing impulses for the operation of power transistors, as it gives off an impulse sequence of constant frequency.

5. Device according to claim 1, characterized in that the impulse generator for the generation of synchronizing impulses for the drive of thyristors consists of an impulse-former stage (5) which generates from the mains voltage a 100 Hz impulse sequence, the beginning of the impulses corresponding in each case to the zero passage (Nulldurchgang) of the mains alternating voltage.

6. Device according to claim 1 characterized in that the counter (2) serves additionally as impulse generator for the generation of synchronizing impulses for the operation of power transistors, as it gives off an impulse sequence of constant frequency.

* * * * *